United States Patent
Jacobs et al.

(10) Patent No.: US 6,304,464 B1
(45) Date of Patent: Oct. 16, 2001

(54) FLYBACK AS LED DRIVER

(75) Inventors: Ronny A. A. M. Jacobs; Bertrand J. E. Hontele, both of Eindhoven (NL); John E. K. G. De Clercq, Oordegem (BE); Marcel J. M. Bucks, Weert; Engbert B. G. Nijhof, Eindhoven, both of (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/610,717

(22) Filed: Jul. 6, 2000

(30) Foreign Application Priority Data

Jul. 7, 1999 (EP) .................................................. 99202228

(51) Int. Cl.$^7$ ................................................ H02M 3/335
(52) U.S. Cl. ...................... 363/21.12; 363/23; 315/169.3
(58) Field of Search .................................. 363/21, 20, 56, 363/97, 98, 131, 132; 315/205, 226, 169.3

(56) References Cited

U.S. PATENT DOCUMENTS 4,561,046 * 12/1985 Kuster ..................................... 363/21

\* cited by examiner

Primary Examiner—Rajnikant Patel

(57) ABSTRACT

The invention relates to a circuit arrangement for operating a semiconductor light source, comprising
  input terminals for connecting a supply voltage,
  input filter means,
  a converter provided with a switching element having a control circuit, and provided with inductive means, and
  output terminals for connecting the semiconductor light source.
The switching element is periodically driven into conduction for a period $t_{on}$. According to the invention, the converter is formed by a flyback converter, and the inductive means are formed by a transformer, and the control circuit controls the $t_{on}$.

7 Claims, 2 Drawing Sheets

FLYBACK AS LED DRIVER

The invention relates to a circuit arrangement for operating a semiconductor light source, comprising
input terminals for connecting a supply voltage,
input filter means,
a converter provided with inductive means and with a switching element having a control circuit, which switching element is periodically in a conducting state for a period $t_{on}$, and
output terminals for connecting the semiconductor light source.

The invention also relates to a signal light provided with such a circuit arrangement.

A circuit arrangement of the type mentioned in the opening paragraph is known from WO 99/07188. The converter serves as a switch-mode power supply of the semiconductor light source. In the case of the known circuit arrangement, a multiresonant forward/flyback converter is used as the converter. This enables a good, i.e. high, power factor to be achieved. Semiconductor light sources are increasingly used as signal lights. In such an application, the advantage of a semiconductor light source over a customary incandescent lamp is a substantial improvement in service life and a substantial reduction in energy consumption. Signal lights often form part of a complex signaling system, for example a traffic control system with traffic lights. Generally, the functioning of semiconductor light sources applied as a light source is determined by the value of the current supplied to the semiconductor. Consequently, the converter should serve as a current source (constant current generator). On the other hand, traffic light installations are often driven by a triac switching circuit. An important property of such a triac switching circuit is that a minimum current must flow through said triac switching circuit if the driver is to function properly in the conducting phase of the light source. This leads to a complex construction of both the converter and the control circuit of the known circuit arrangement. This constitutes a drawback.

It is an object of the invention to provide a circuit arrangement of the type described in the opening paragraph, wherein the above-mentioned drawback is precluded. In accordance with the invention, this object is achieved in that the circuit arrangement of the type mentioned in the opening paragraph is characterized in accordance with the invention in that the converter is a flyback converter and the inductive means are formed by a transformer, and in that the control circuit controls the period $t_{on}$.

It has surprisingly been found that the circuit arrangement in accordance with the invention can suitably be used to reliably operate a semiconductor light source as a replacement for an incandescent lamp in a signal light, also in the case of low temperatures, and said circuit arrangement is also characterized by great simplicity, which is very advantageous. Controlling the period $t_{on}$ in such a manner that it changes only little has the important advantage that the flyback converter is capable of achieving a very good power factor as well as a very low level of harmonic distortion (THD) of mains current extracted from the supply source. The power supply at the input terminals of the circuit arrangement will generally take place from a mains voltage source and hence by means of an alternating voltage. If the alternating voltage has a period T, then, in a preferred embodiment of the circuit arrangement in accordance with the invention, the control circuit involves an integration over a period of at least 2.5 T. The realization of a very good power factor can thus be combined with a very fast feedback with respect to variations, such as temperature variations.

In the case of alternating current power supply, preferably, rectifier means are present between the input terminals and the converter. The low level of THD can be further improved by incorporating only a high-frequency filter between rectifier means and flyback converter. This also precludes an adverse effect on the power factor, which would be caused by clipping of the rectified supply voltage.

The converter can be driven into conduction at such a fixed frequency that current stops flowing simultaneously through the primary and secondary windings for some time. Such a mode of operation is commonly referred to as discontinuous mode. Preferably, however, the converter is operated in such a mode that a reduction to zero of the current through the secondary transformer winding causes the switching element to be driven into conduction. This mode of operation, which is referred to as critical mode, can be realized by means of relatively simple means and additionally has the important advantage that peak currents are minimized and switching losses counteracted.

These and other aspects of the invention will be apparent from and elucidated with reference to the embodiments described hereinafter.

In the drawings:

FIG. 1 diagrammatically shows the circuit arrangement,

Figure 1:
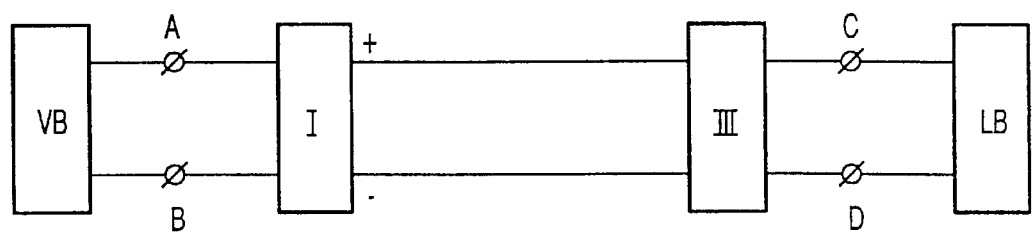

In FIG. 1, A, B are input terminals for connecting a supply source VB, for example an alternating voltage source having a period T, which is provided, for example, with a solid-state relay. Input filter means are indicated by means of I, and a converter with a control circuit is indicated by means of III. C, D are output terminals for connecting the semiconductor light source LB. The input filter means I are provided with a positive pole + and a negative pole −, which are connected to the output terminals C and D, respectively, via the converter III. The circuit arrangement also comprises a self-regulating current-limiting network, not shown, which ensures, in a manner which is known per se, that in the off-state of the converter a leakage current generated in the supply source can flow away to a sufficient degree. By virtue thereof, an increase of the voltage at the input terminals and hence a wrong status test are precluded. Such a network is disclosed in, for example, WO 99/07187.

Figure 2:
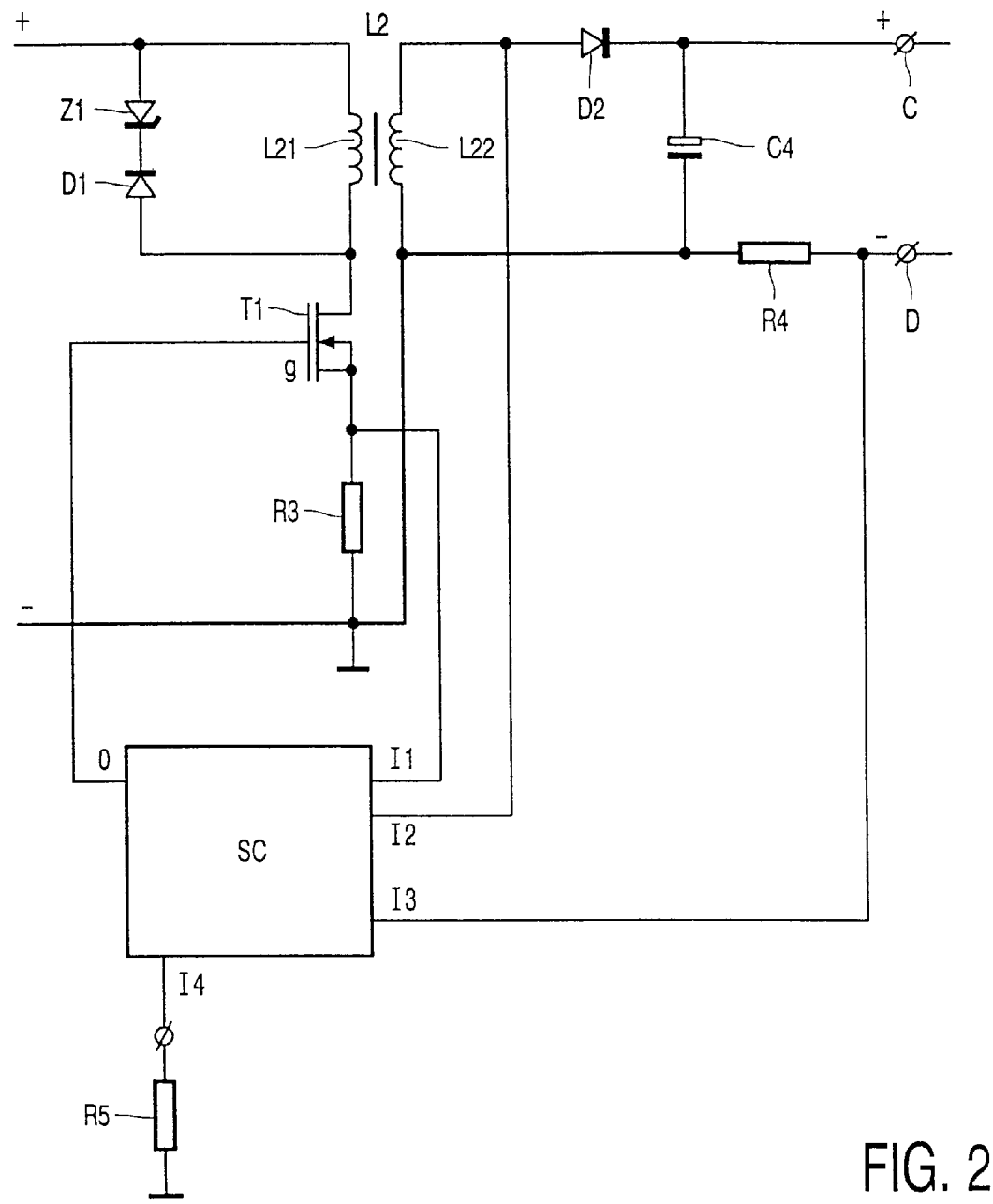
FIG. 2 shows a diagram of a converter with a control circuit in greater detail.
Figure 3:
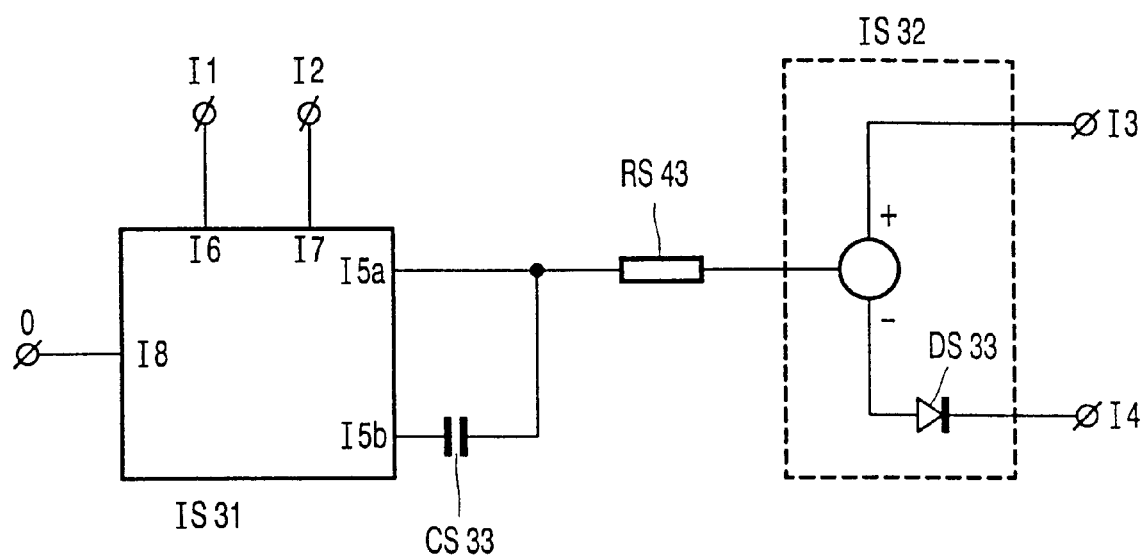
FIG. 3 shows the control circuit in greater detail.

In FIG. 2, the converter and the associated control circuit are shown in greater detail. The converter is a flyback converter with a switching element T1 connected in series with a transformer L2 provided with a primary winding L21 and a secondary winding L22. The transformer forms the inductive means. The primary winding L21 is shunted by a diode D1 which is connected in series with a zener diode Z1 which is oppositely poled. As a result, clamping takes place of any peak voltages as a result of a leakage self-inductance of the transformer L2 at a level below the breakdown voltage of the switching element T1. A current-measuring impedance R3 which is connected in series with the switching element T1 is also incorporated in the control circuit. The secondary winding L22 is connected, via a diode D2, to an output terminal C and, via a current-measuring impedance R4, to the output terminal D. In addition, a buffer capacitor C4 is connected across the series-combination of diode D2 and secondary winding L22. The control circuit SC is connected with an output O to a control electrode g of the switching element T1. An input I1 of the control circuit SC is connected to the current measuring-impedance R3, an input I2 is connected to the secondary winding L22, and an input I3 is connected to the current measuring-impedance R4. The control circuit is also provided with an input I4 to which a temperature-sensitive element R5, such as a NTC impedance, is connected. This enables the current through the semiconductor light source to be compensated for temperature changes of the light source and the direct surroundings thereof. For this purpose, a correction circuit IS32 in the control circuit is used to carry out a correction of the signal received at the input I3 by means of the signal received at the input I4, as is shown in FIG. 3. In this respect, a diode DS33 in the path of the temperature-dependent signal ensures that the correction takes place only if the temperature-dependent signal has dropped below a threshold value. The corrected signal is supplied to connection pins I5a, I5b of a control-IC IS31, via a combination of a resistor RS43 and a capacitor CS33. The resistor RS43 and the capacitor CS33 in combination with an operational amplifier present in the control IC ensure that the corrected signal is integrated. The size of the resistor RS43 and the capacitor CS33 is preferably chosen to be such that the integration time is at least 2.5 times the period T of the alternating voltage of the supply source. The control IC is connected through a connection pin I6 to the input I1, and through a connection pin I8 to the output O of the control circuit. The input I2 is connected to a connection pin I7 of the control IC IS31. The control IC is preferably a power factor correction IC.

Figure 4:
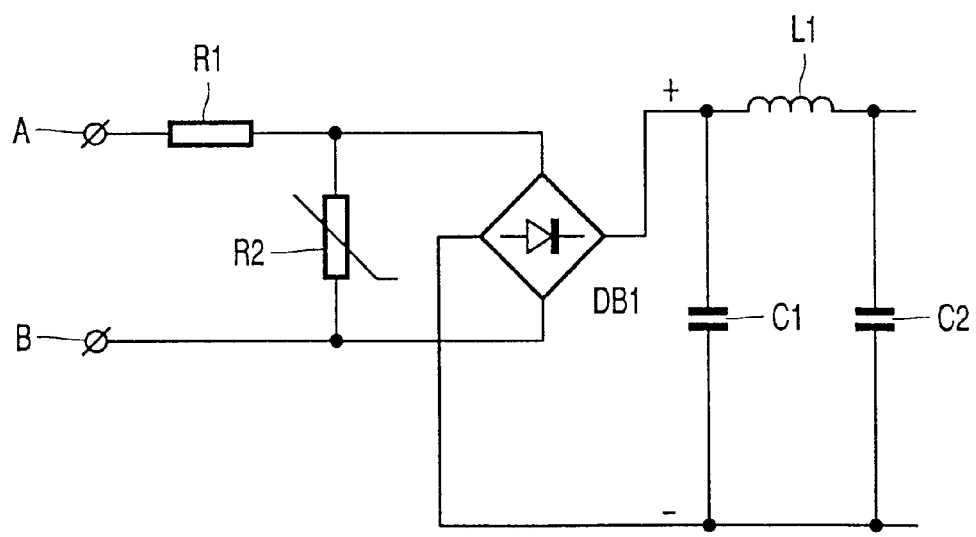
FIG. 4 is a detailed view of input filter means.

The filter means, shown in FIG. 4, comprise a fusistor R1, a varistor R2, a rectifier bridge DB1 and a π filter consisting of a self-inductance L1 and capacitors C1 and C2.

In the example described hereinabove, the converter operates in the critical mode.

In a practical embodiment of the circuit arrangement as described hereinabove, this circuit arrangement can suitably be connected to a driver having a voltage in the conducting state of at least 80 V, 60 Hz and at most 135 V, 60 Hz, and said circuit arrangement can also suitably be used to operate a semiconductor light source comprising a matrix of 6*3 LEDs, made by Hewlett Packard, having a forward voltage $V_F$, defined at 250 mA and an ambient temperature of 25° C., between 2 V and 3 V. If the converter is activated, the positive pole + of the input filter means carries a rectified voltage having an effective value of at least 80 V and at most 135 V. In conditions where the maximum permissible temperature is reached while the supply voltage is minimal, the circuit arrangement has a power efficiency of 75%. In comparable conditions, the power efficiency of the circuit arrangement in accordance with WO 99/07188 is only 65%.

The flyback converter has a 3NB60-type MOSFET, made by SGS-Thompson, as the switching element. The transformer consists of a ferrite core with a primary winding of 110 turns of 0.2 mm and a secondary winding having 2 sections of 15 turns of 0.355 mm each. The control circuit comprises a L6561-type power factor correction IC, made by SGS-Thompson, as the control IC, wherein the connection pin I5a corresponds to the pin INV, I5b corresponds to COMP, I6 corresponds to CS, I7 corresponds to ZCD, and I8 corresponds to OUT. The correction circuit IS32 comprises the diode DS33 of the type LL4148. The comparator IS33 is a dual comparator of the type LM293, which is also made by SGS-Thompson. The current-measuring impedances R3 and R4 are embodied so as to be a parallel arrangement of, respectively, 2 and 3 resistors of 1 Ω each. The capacitor C4 is an electrolytic capacitor having a capacitance of 470 µF. The temperature-sensitive element R5 is a NTC-resistor of the type B57620C103, made by Siemens.

The capacitors C1 and C2 are filter capacitors having a capacitance of 220 nF each. The self-inductance has a size of 2.1 mH. The rectifier bridge DB1 is built up of 4 diodes, for example, of the type IN4007.

The converter can suitably be used to reliably operate the LED array in an ambient temperature range from −40° C. to 70° C. In the operating state of the flyback converter, this converter supplies a minimum current of 540 mA to the connected LED array. The converter then withdraws a minimum power of 6 W, which corresponds to a current consumption of at least 45 mA. This proves to be sufficient as a holding current for triac switches forming part of the supply source. The correction of the instantaneous current through the LED array by means of the temperature signal originating from the NTC resistor is preferably such that it takes place at an ambient temperature from 25° C. upwards. In this manner, it is achieved in a very simple manner that, on the one hand, throughout the ambient temperature range from −40° C. to +70° C., the holding current required by the supply source is withdrawn and, on the other hand, that the quantity of light generated by the LED array has a minimum size.

The circuit arrangement described hereinabove can suitably be used to operate a signal light comprising a light source consisting of a LED array with an installed power in the range from 6 W as a minimum to at least 15 W.

What is claimed is:

1. A circuit arrangement for operating a semiconductor light source, comprising:

a. input terminals for electrically connecting a source of AC power having a period T;

b. a filter electrically connected to the input terminals;

c. a flyback converter electrically connected to the filter and including a transformer electrically connected to a switching element;

d. a control circuit for periodically effecting switching of the switching element into a conducting state having a period $t_{on}$ and for adjusting the duration of said period in response to variations in an ambient condition over an integration period which is substantially longer than T; and e. output terminals for electrically connecting the circuit arrangement to the semiconductor light source.

2. A circuit arrangement as claimed in claim 1 where the ambient condition is ambient temperature.

3. A circuit arrangement as claimed in claim 1 where, in the operating state, the converter is operated in the critical mode.

4. A circuit arrangement as claimed in claim where the integration period is at least 2.5 T.

5. A signal light arrangement as claimed in claim 1 comprising an integral housing for the semiconductor light source and the circuit arrangement.

6. A signal light arrangement comprising a semiconductor light source and a circuit arrangement for operating said semiconductor light source, comprising:

a. input terminals for electrically connecting a source of AC power having a period T;

b. a filter electrically connected to the input terminals;

c. a flyback converter electrically connected to the filter and including a transformer electrically connected to a switching element;

d. a control circuit for periodically effecting switching of the switching element into a conducting state having a period $t_{on}$ and for adjusting the duration of said period in response to variations in an ambient condition over an integration period which is substantially longer than T; and e. output terminals for electrically connecting the circuit arrangement to the semiconductor light source.

7. A circuit arrangement as claimed in claim 6 where the ambient condition is ambient temperature.

* * * * *